US010779507B2

(12) United States Patent
Pietrocarlo et al.

(10) Patent No.: US 10,779,507 B2
(45) Date of Patent: Sep. 22, 2020

(54) PET TREAT DISPENSING CONTAINER WITH CAP FASTENER

(71) Applicant: Bark Pouch LLC, Chicago, IL (US)

(72) Inventors: Lauren Pietrocarlo, Chicago, IL (US); Kaitlin Bishop, Chicago, IL (US); Brandi Barker, Chicago, IL (US); Tim Haley, Chicago, IL (US)

(73) Assignee: Bark Pouch LLC, Chicago, IL (US)

( * ) Notice: Subject to any disclaimer, the term of this patent is extended or adjusted under 35 U.S.C. 154(b) by 1093 days.

(21) Appl. No.: 14/689,242

(22) Filed: Apr. 17, 2015

(65) Prior Publication Data

US 2015/0296743 A1    Oct. 22, 2015

Related U.S. Application Data

(60) Provisional application No. 61/982,189, filed on Apr. 21, 2014.

(51) Int. Cl.
| | |
|---|---|
| *A01K 5/00* | (2006.01) |
| *A01K 7/00* | (2006.01) |
| *A01K 5/01* | (2006.01) |
| *A45F 3/16* | (2006.01) |
| *A45F 3/20* | (2006.01) |

(52) U.S. Cl.
CPC .............. *A01K 7/00* (2013.01); *A01K 5/0114* (2013.01); *A45F 3/16* (2013.01); *A45F 3/20* (2013.01)

(58) Field of Classification Search
CPC ........ A45F 2003/166; A45F 3/20; A45F 3/16; B65D 55/16; B65D 55/165; A01K 5/0114; A01K 7/00

USPC .... 119/51.01, 51.5, 65, 67–69, 72, 72.5, 74; 383/62, 80, 96, 901, 904, 906, 66; 222/539, 175, 547, 566–568, 570, 527, 222/498, 530, 529, 528, 92, 93, 491, 495, 222/105–107; 215/306, 11.1, 11.3, 11.4, 215/11.6; 224/148.1–148.7; 220/703, 220/711, 713–715, 751, 290, 375, 379; 604/408, 410
See application file for complete search history.

(56) References Cited

U.S. PATENT DOCUMENTS

| | | |
|---|---|---|
| 506,982 A | 10/1893 | Diamond |
| 2,976,988 A | 3/1961 | Schneider |
| D196,939 S | 11/1963 | Cigognetti |
| 3,238,984 A | 3/1966 | Shurtleff |
| D235,739 S | 7/1975 | Christensen |
| D236,807 S | 9/1975 | Schmitt |

(Continued)

*Primary Examiner* — Jes F Pascua
*Assistant Examiner* — Nina K Attel
(74) *Attorney, Agent, or Firm* — K & L Gates LLP

(57) ABSTRACT

An animal treat dispensing container is disclosed. An example treat dispensing container includes a pouch configured to contain a food substance ingestible by an animal, a nozzle connected to a first exterior face of the pouch and configured to enable the food substance to exit the pouch, and a nozzle cap configured to enclose the nozzle. The treat dispensing container also includes a strap configured to connect the nozzle cap to the nozzle and a hook or fastener located on a second exterior face of the pouch. The hook is configured to secure at least one of the nozzle cap and the strap after the nozzle cap is removed from the nozzle, thereby preventing a mouth of the animal from biting or otherwise ingesting the nozzle cap when the animal is licking the food substance from the nozzle.

21 Claims, 9 Drawing Sheets

(56) References Cited

U.S. PATENT DOCUMENTS

| | | |
|---|---|---|
| D272,762 S | 2/1984 | Tanner, II |
| D291,491 S | 8/1987 | Larkin |
| 4,856,651 A | 8/1989 | Francis, Jr. |
| D303,714 S | 9/1989 | Manschot |
| D304,546 S | 11/1989 | Cattach |
| D324,566 S | 3/1992 | Schmidt |
| 5,176,452 A | 1/1993 | Stern |
| D338,399 S | 8/1993 | Conte, Jr. |
| 5,307,955 A | 5/1994 | Viegas |
| D351,500 S | 10/1994 | Yang |
| 5,373,966 A | 12/1994 | O'Reilly |
| D358,468 S | 5/1995 | Howard |
| D360,577 S | 7/1995 | van Loo |
| D360,824 S | 8/1995 | Ossendryver |
| D364,268 S | 11/1995 | Brown |
| 5,601,221 A * | 2/1997 | Karr .................. A45F 3/16 |
| | | 222/175 |
| 5,609,899 A | 3/1997 | Spector |
| 5,632,416 A | 5/1997 | Lane, Jr. |
| 5,731,021 A | 3/1998 | Spector |
| 5,782,562 A | 7/1998 | Anspacher |
| D413,258 S | 8/1999 | Voller |
| 5,941,421 A | 8/1999 | Overman |
| D416,676 S | 11/1999 | Fitzgerald |
| D429,459 S | 8/2000 | Berman |
| D430,794 S | 9/2000 | Parent-Inch |
| D436,846 S | 1/2001 | Millon |
| D439,328 S | 3/2001 | Nielsen |
| D440,868 S | 4/2001 | Berman |
| 6,220,702 B1 | 4/2001 | Nakamura |
| 6,245,367 B1 | 6/2001 | Galomb |
| D452,144 S | 12/2001 | Tedeschi, Jr. |
| 6,364,864 B1 | 4/2002 | Mohiuddin |
| D470,758 S | 2/2003 | Bakersmith |
| D470,763 S | 2/2003 | Garcia |
| D470,764 S | 2/2003 | Garcia |
| D476,225 S | 6/2003 | De La Garza |
| D480,630 S | 10/2003 | Berman |
| D483,562 S | 12/2003 | Barton |
| 6,662,829 B2 | 12/2003 | Credle, Jr. |
| 6,719,140 B1 | 4/2004 | Rinsler |
| 6,742,724 B2 | 6/2004 | Duqueroie |
| D496,583 S | 9/2004 | Berman |
| 6,854,888 B1 | 2/2005 | Brown |
| D505,066 S | 5/2005 | Ootubo |
| D512,650 S | 12/2005 | Dapsance |
| D527,278 S | 8/2006 | Ueda |
| D532,702 S | 11/2006 | Berman |
| 7,178,313 B2 | 2/2007 | Bezek |
| D543,117 S | 5/2007 | Sanfilippo |
| D550,570 S | 9/2007 | Berman |
| D551,567 S | 9/2007 | Berman |
| D553,998 S | 10/2007 | Berman |
| D555,011 S | 11/2007 | Spanjaard |
| D558,596 S | 1/2008 | Berman |
| D558,601 S | 1/2008 | Berman |
| D573,483 S | 7/2008 | Berman |
| D582,788 S | 12/2008 | Smith |
| D583,681 S | 12/2008 | Bernard |
| D593,422 S | 6/2009 | Berman |
| D597,855 S | 8/2009 | Berman |
| D597,856 S | 8/2009 | Sherrill |
| D598,783 S | 8/2009 | Berman |
| D603,605 S | 11/2009 | Dingman |
| 7,658,542 B2 | 2/2010 | Risgalla |
| 7,686,513 B2 | 3/2010 | Knoerzer |
| 7,690,521 B1 * | 4/2010 | Herrera .................. A61J 11/04 |
| | | 141/340 |
| D615,646 S | 5/2010 | Russell |
| D619,907 S | 7/2010 | Ueda |
| D623,536 S | 9/2010 | Bohmke |
| D626,703 S | 11/2010 | Neff |
| 7,857,515 B2 | 12/2010 | Dais |
| D650,291 S | 12/2011 | Ager |
| 8,104,959 B2 | 1/2012 | Lucas et al. |
| D654,372 S | 2/2012 | Hung |
| D662,202 S | 6/2012 | O'Donnell |
| 8,267,283 B2 * | 9/2012 | Staton .................. A45F 3/20 |
| | | 222/175 |
| D671,839 S | 12/2012 | Risgalla |
| D676,763 S | 2/2013 | Kenmotsu |
| D680,446 S | 4/2013 | Moynihan |
| D684,481 S | 6/2013 | Campos |
| D686,794 S | 8/2013 | Ueda |
| D690,605 S | 10/2013 | Hong |
| D693,566 S | 11/2013 | Martin |
| D699,128 S | 2/2014 | Moynihan |
| D702,132 S | 4/2014 | Gebhardt |
| D707,134 S | 6/2014 | Simpson |
| D711,251 S | 8/2014 | Epstein |
| D711,749 S | 8/2014 | Kim |
| 8,794,833 B2 | 8/2014 | Runyon |
| D712,245 S | 9/2014 | Lew |
| D714,658 S | 10/2014 | Bielawski |
| D723,938 S | 3/2015 | Karasawa |
| D724,953 S | 3/2015 | Epstein |
| D725,260 S | 3/2015 | Cesa |
| D727,169 S | 4/2015 | Pease |
| D729,071 S | 5/2015 | Bradley |
| D734,165 S | 7/2015 | Kearns |
| D734,676 S | 7/2015 | Kojime |
| D734,940 S | 7/2015 | Fay |
| D744,854 S | 12/2015 | Murray |
| D747,094 S | 1/2016 | Ciptak |
| D747,656 S | 1/2016 | May |
| 2002/0121530 A1 * | 9/2002 | Socier .................. B65D 47/2031 |
| | | 222/494 |
| 2002/0193762 A1 | 12/2002 | Suydam |
| 2003/0002755 A1 | 1/2003 | Kim et al. |
| 2003/0136345 A1 | 7/2003 | O'Rourke |
| 2003/0223653 A1 | 12/2003 | Knoerzer et al. |
| 2004/0096127 A1 | 5/2004 | Rosen |
| 2005/0013905 A1 | 1/2005 | Hughes |
| 2005/0015070 A1 | 1/2005 | Delnevo et al. |
| 2006/0189962 A1 | 8/2006 | Burtoft |
| 2008/0137998 A1 | 6/2008 | Burfiend |
| 2009/0134112 A1 * | 5/2009 | Reeves .................. A61J 11/008 |
| | | 215/11.6 |
| 2010/0025429 A1 * | 2/2010 | Ager .................. B65B 9/20 |
| | | 222/92 |
| 2015/0183554 A1 * | 7/2015 | Kessler, Jr. .......... B65D 33/065 |
| | | 383/10 |
| 2015/0296743 A1 | 10/2015 | Pietrocarlo et al. |

\* cited by examiner

FIG. 8

| Nutrients | Per Serving | Per 100g | Nutrients | Per Serving | Per 100g |
|---|---|---|---|---|---|
| Basic Components | | | Protein (g) | 6.14 | 8.77 |
| Gram Weight (g) | 70.00 | 100.00 | Fructose (g) | 0 | 0 |
| Calories (kcal) | 163.80 | 234.00 | Glucose (g) | 0 | 0 |
| Calories from Fat (kcal) | 131.04 | 187.20 | Lactose (g) | 1.01 | 1.45 |
| Calories from SatFat (kcal) | 89.46 | 127.80 | Maltose (g) | 0 | 0 |
| Ash (g) | 1.01 | 1.44 | Sucrose (g) | 0 | 0 |
| Carbohydrates (g) | 2.13 | 3.05 | Total Sugars (g) | 1.01 | 1.45 |
| Cholesterol (mg) | 63.35 | 90.50 | Vitamins | | |
| Dietary Fiber (g) | 0 | 0 | Vitamin A - IU (IU) | 481.60 | 688.00 |
| Fat (g) | 14.56 | 20.80 | Vitamin C (mg) | 0 | 0 |
| Mono Fat (g) | 3.62 | 5.17 | Minerals | | |
| Poly Fat (g) | 0.71 | 1.01 | Calcium (mg) | 150.50 | 215.00 |
| Saturated Fat (g) | 9.94 | 14.20 | Iron (mg) | 0.39 | 0.55 |
| Trans Fatty Acid (g) | 0.32 | 0.46 | Sodium (mg) | 217.00 | 310.00 |
| Water (g) | 46.16 | 65.94 | | | |

| Nutrients | Per Serving | Per 100g | Nutrients | Per Serving | Per 100g |
|---|---|---|---|---|---|
| Basic Components | | | Protein (g) | 8.88 | 12.68 |
| Gram Weight (g) | 70.00 | 100.00 | Fructose (g) | 0 | 0 |
| Calories (kcal) | 73.50 | 105.00 | Glucose (g) | 0 | 0 |
| Calories from Fat (kcal) | 28.85 | 41.22 | Lactose (g) | 1.39 | 1.99 |
| Calories from SatFat (kcal) | 18.08 | 25.83 | Maltose (g) | 0 | 0 |
| Ash (g) | 0.99 | 1.41 | Sucrose (g) | 0 | 0 |
| Carbohydrates (g) | 2.32 | 3.32 | Total Sugars (g) | 1.39 | 1.99 |
| Cholesterol (mg) | 33.88 | 48.40 | Vitamins | | |
| Dietary Fiber (g) | 0 | 0 | Vitamin A - IU (IU) | 98.00 | 140.00 |
| Fat (g) | 3.21 | 4.58 | Vitamin C (mg) | 0 | 0 |
| Mono Fat (g) | 0.88 | 1.26 | Minerals | | |
| Poly Fat (g) | 0.26 | 0.37 | Calcium (mg) | 191.10 | 273.00 |
| Saturated Fat (g) | 2.01 | 2.87 | Iron (mg) | 0.25 | 0.36 |
| Trans Fatty Acid (g) | 0.06 | 0.08 | Sodium (mg) | 124.60 | 178.00 |
| Water (g) | 54.61 | 78.01 | | | |

FIG. 9

PET TREAT DISPENSING CONTAINER WITH CAP FASTENER

PRIORITY CLAIM

The present application claims priority to and the benefit of U.S. Provisional Patent Application No. 61/982,189, filed on Apr. 21, 2014, the entirety of which is incorporated herein by reference.

BACKGROUND

Dog guardians, trainers, and owners often need to reverse a bite inhibition or at the very least, modify undesirable behaviors of dogs. Some dogs are raised in abusive environments and develop fear or anxiety in response to certain human activity or other stimuli. Other dogs are not properly trained as puppies and develop annoying, destructive, or even dangerous habits or behaviors. In extreme instances, fear, anxiety, bad habits, and other undesirable behaviors may result in a dog lashing out against humans, other dogs, and/or other animals. Dog guardians, trainers, and owners are oftentimes successful in reducing or eliminating undesired behaviors such as fear-based responses, resource guarding, barrier intolerance, reaction to sudden environmental contrast, chewing, nipping, housebreaking, separation anxiety, inappropriate vocalization, handling, crate sensitivity, and leash pulling.

To modify a dog's behavior, dog guardians, trainers, and owners teach dogs to reliably respond on cue to redirection tools while the dogs are experiencing a behavioral issue. Oftentimes, guardians, trainers, and owners improve the effectiveness of redirection tools by incentivizing a dog that adheres to or follows the redirection tool. Per dog training best practices, incentives should be positively rewarding to the dog while being healthy.

It is well known that using food rewards as an incentive during dog training has many advantages. Dog guardians, trainers, and owners know that if a dog is given a food reward that the dog values at the correct time, behavior will improve. If a dog develops a conditioned emotional response from a high-value food reward for a stimulus that the dog has previously exhibited negative responses, training becomes much easier on both the dog and the guardian/trainer/owner. Recent scientific studies have shown that dogs have significantly higher emotional intelligence than previously understood. These studies conclude that dogs are motivated by a preference for maintaining peace within social groups, rather than dominating and fighting to optimize their environment. Utilizing food as a reward in dog training allows for improved results without the negative and potentially dangerous effects of punitive methods.

SUMMARY

The present disclosure provides a new and innovative treat dispensing container for storing and providing a food substance that is safe for a dog (or other animal) and convenient for dog guardians, trainers, and owners. The treat dispensing container is configured to be used as a positive reinforcement training tool for basic obedience training, leash etiquette, and more serious fearful aggression and high sensitivity treatment and training. The food substance housed within the container includes natural, human grade ingredients, thereby creating a healthy and high value food reward.

The example treat dispensing container disclosed herein is configured to enclose a substantially all natural, healthy, and minimally processed food substance for use in dog training. To hold the attention of or entice a dog (or other animal), the food substance is may be soft, chewy, moist, and smelly. The example treat dispensing container disclosed herein is configured to enable dog guardians, trainers, or owners to dispense the food substance in a controlled manner directly from the container into the dog's mouth. The treat dispensing container is shaped such that the food substance may be dispensed using only one hand of the dog guardian, trainer, or owner, thereby freeing the other hand to interact with the dog. Such a configuration for a treat dispensing container prevents or substantially eliminates the soft, chewy, moist, and smelly food substance (and stinky/slimy drool of the dog) from contacting the hands and clothing of the dog guardians, trainers, or owners.

The example treat dispensing container disclosed herein includes features that prevent a dog from injuring itself while feeding from the container. A nozzle of the treat dispensing container is secured to the treat dispensing container to prevent a dog from accidently biting and detaching the nozzle. A nozzle cap is connected to the nozzle via a strap to prevent the cap from being accidently chewed or ingested by the dog during use. The strap and/or the nozzle cap are secured to a face of the container opposite the nozzle to further prevent the dog from accidently chewing or ingesting the cap.

In an example embodiment, a treat dispensing container apparatus includes a pouch including an interior side, an exterior side, and a window located on a first face of the exterior side and an opposing face of the interior side. The window includes a through-hole that enables access from the exterior side to the interior side of the pouch. The interior side of the pouch is configured to contain a food substance ingestible by an animal. The treat dispensing container apparatus also includes a nozzle connected to the window. The nozzle is configured to dispense the food substance contained within the interior side of the pouch. The treat dispensing container apparatus further includes a nozzle cap configured to enclose the nozzle and a strap configured to connect the nozzle cap to the nozzle. The treat dispensing container apparatus moreover includes a hook located on a second face of the exterior side of the pouch. The hook is configured to secure at least one of the nozzle cap and the strap when the nozzle cap is removed from the nozzle.

In another example embodiment, a treat dispensing container apparatus includes a pouch configured to contain a food substance ingestible by an animal, a top tab connected to a top of the pouch, the top tab including a hole at a first side, and a bottom tab connected to a bottom of the pouch, the bottom tab including at least one hole. The treat dispensing container also includes a nozzle connected to a first exterior face of the pouch and configured to enable the food substance to exit the pouch. The nozzle is located adjacent to a second side of the top tab opposite of the hole at the first side of the top tab. The treat dispensing container further includes a nozzle cap configured to enclose the nozzle and a strap configured to connect the nozzle cap to the nozzle. Moreover, the treat dispensing container includes a hook located on a second exterior face of the pouch. The hook is configured to secure at least one of the nozzle cap and the strap after the nozzle cap is removed from the nozzle.

In yet another example embodiment, a treat dispensing container safety apparatus includes a pouch configured to contain a food substance ingestible by an animal, a nozzle connected to a first exterior face of the pouch and configured to enable the food substance to exit the pouch, and a nozzle cap configured to enclose the nozzle. The treat dispensing container also includes a strap configured to connect the nozzle cap to the nozzle and a hook located on a second exterior face of the pouch. The hook is configured to secure at least one of the nozzle cap and the strap after the nozzle cap is removed from the nozzle.

Additional features and advantages of the disclosed system, method, and apparatus are described in, and will be apparent from, the following Detailed Description and the Figures.

BRIEF DESCRIPTION OF THE FIGURES

FIGS. 8 and 9 show diagrams of nutritional information for a food substance of the treat dispensing container of FIGS. 1 to 7, according to an example embodiment of the present disclosure.

DETAILED DESCRIPTION

Figure 1:
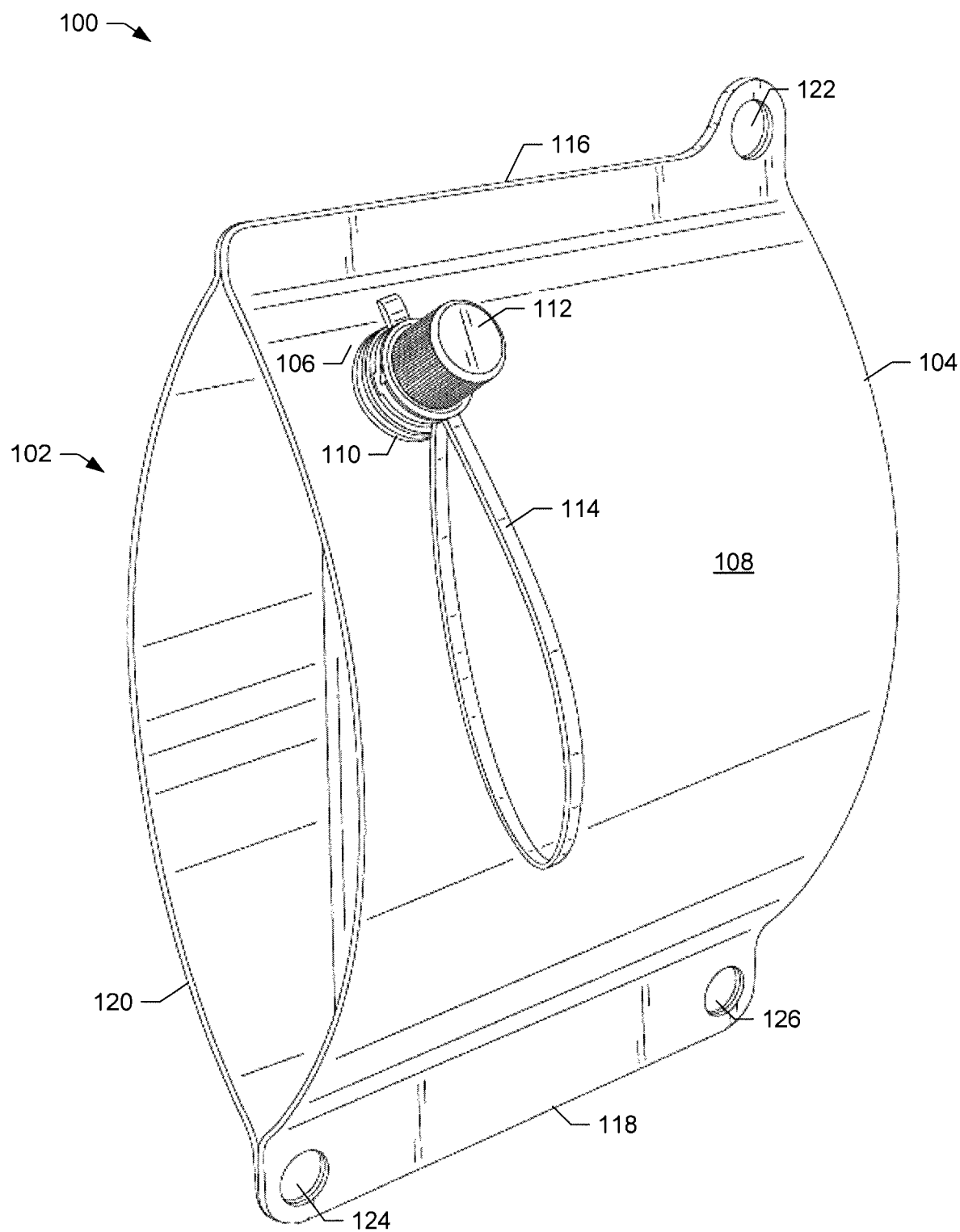
FIG. 1 shows a diagram of a front-perspective view of an example animal treat dispensing container, according to an example embodiment of the present disclosure.

The present disclosure relates in general to a treat dispensing container apparatus and, in particular, to a treat dispensing container apparatus configured to easily and cleanly dispense a food substance into a mouth of a dog while preventing the dog from biting or injecting a nozzle cap. The example treat dispensing container disclosed herein may be used as a positive reinforcement training tool for obedience training, leash etiquette, and/or more serious fearful aggression and high sensitivity treatment and training. The treat dispensing container is configured to store a food substance that includes substantially natural, human grade ingredients that provide a healthy and high value reward.

Known products for obedience training and leash etiquette can be ineffective at holding a dog's attention. This is especially true for puppies, which are easily distracted. Some known products (e.g., pellet-based treats, biscuit treats, leathery treats, etc.) are able to attract and hold the attention of a dog but at the cost of using highly processed or artificial ingredients, fillers, and preservatives, which may be detrimental to a dog's health.

Further, the packaging of these known products may be potentially hazardous to dogs. For instance, some known products such as glass jars are not easy to open and messily dispense food to a pet. Additionally, glass jars have potential safety issues if the jars are dropped or become chipped/cracked. Known squeeze tubes and 'baby food pouches' are more portable than jars. However, these known squeeze tubes and pouches are difficult to control the flow of the food substance, creating a stinky, slimy, drolly mess on the guardian/trainer/owner and the tube itself. Moreover, the nozzles (and nozzle caps) of these known tubes and pouches are not designed with dogs in mind and may be bitten easily bitten and ingested. The drawbacks and detriments of these known products cause trainers and owners to think twice about carrying and dispensing food substance while training or walking a dog outside, where access to washroom is limited.

The example treat dispensing container disclosed herein solves at least some of the above problems by providing a natural, healthy, soft, chewy, moist, and smelly food substance in a pouch with a nozzle that may be licked by a dog. The pouch and nozzle are configured to control the flow of the food substance so that the flow is fast enough to satisfy the licking of a dog but slow enough to prevent excess food substance from leading to messy hands, gooey pockets, and potentially nicked fingers from over-excited dog teeth. The soft, chewy, moist, and smelly nature of the food substance is able to hold the attention of dogs during a training session or a walk in high distraction environments while being easy to dispense and reseal.

As disclosed below in more detail, the food substance of the treat dispensing container has been proven to help dogs that were previously unable to leave their own home. This high value reward is crucial to helping guardians/trainers/owners work with sensitive dogs on a consistent basis, thereby allowing for progress and improvement in the behavior of the dogs. The configuration of the pouch and nozzle of the example treat dispensing container enables a continuous dispensing of the treat, which is sometimes necessary for counterconditioning and desensitization training programs. Further, the configuration of the treat dispensing container enables a liquefied paste or small portion of the food substance to be dispensed in a controlled manner for as long as a trainer/owner applies pressure to the pouch.

As purchased by a guardian/trainer/owner, the example treat dispensing container disclosed herein includes a single-handed use pouch having a wide flat surface area for easy handling and squeezing. At least one corner of the pouch includes an attachment tab/hole to enable the pouch to be attached to a leash, training belt, etc. The nozzle or spout of the container is configured to be located in a corner that does not include an attachment hole, thereby preventing a dog from accidently latching onto or being caught on the hole. The nozzle is sealed with a tamper-banded twist off cap. The cap may be connected to the nozzle via a lanyard/strap, thereby preventing the cap from being lost, bitten, or ingested.

Throughout the following disclosure, reference is made to dog training. However, it should be appreciated that the example treat dispensing container disclosed herein may be used for other animals as well. For example, the treat dispensing container may be used for training cats, rabbits, ferrets, birds, horses, pigs, reptiles, etc. Further, while reference is made to using the treat dispensing container for dog training, it should be appreciated that the container may be used to simply provide a dog treat outside the context of training.

Animal Treat Dispensing Container Embodiments

FIG. 1 shows a diagram of a front-perspective view of an example animal treat dispensing container 100, according to an example embodiment of the present disclosure. The example treat dispensing container 100 includes a pouch 102 that includes an exterior side 104 and an interior side (not shown). The pouch 102 also includes and a window 106 located on a first face 108 of the exterior side 104 that includes a through-hole to the interior side. The through-hole enables access from the exterior side 104 to the interior side of the pouch 102. The window 106 and/or the through-hole may have a diameter between 1 millimeter (mm) and 25 mm, and more preferably between 10 mm and 15 mm. The example pouch 102 is configured to store a food substance. Further information on example compositions of the food substance are described below in conjunction with FIGS. 8 and 9.

The treat dispensing container 100 and/or the pouch 102 shown in FIGS. 1 to 7 may be made of any material including for example, any plastic or plastic polymer. Preferably, the material is Bisphenol A ("BPA") free. In some instances, the exterior side 104 and/or the interior side may be coated with a material. For example, the interior side may include an aluminum, foil, or aluminum oxide coating for food protection. Additionally or alternatively, the exterior side 104 may include a paint coating or plastic polymer coating to improve grip or handling. The exterior side 104 may also include printed text and/or graphics.

The example treat dispensing container 100 illustrated in FIGS. 1 to 7 is not limited to the scale shown. For example, the treat dispensing container 100 may have a height between 50 mm and 300 mm, and more preferably between 100 mm and 150 mm. Additionally, the treat dispensing container may have a width that is independent of the height, the width having dimensions between 20 mm and 200 mm, and more preferably between 30 and 80 mm.

Returning to FIG. 1, the example animal treat dispensing container 100 includes a nozzle 110 connected to the window 106. The nozzle 110 may be secured to the window 106 and/or the interior and exterior side 104 of the pouch 102 to prevent the nozzle 110 from being disconnected when engaged by the mouth of an animal. For example, the nozzle 110 may be heat pressed, laser welded, glued, stapled, or otherwise connected to the window to prevent disconnection. In some embodiments, the window 106 may be reinforced with a thicker layer of material compared to the rest of the pouch 102 to prevent the nozzle 110 from ripping or otherwise being pulled through the window 106.

The example nozzle 110 is configured to dispense a food substance contained within the inside of the pouch 102. The nozzle 110 is enclosed by a nozzle cap 112. The nozzle 110 is also connected to the nozzle cap 112 via a strap 114. The combination of the pouch 102, nozzle 110, and nozzle cap 112 are configured to be air-tight to preserve the contents of the food substance and prevent the food substance from escaping when the nozzle cap 112 is connected to the nozzle 110.

Figure 2:
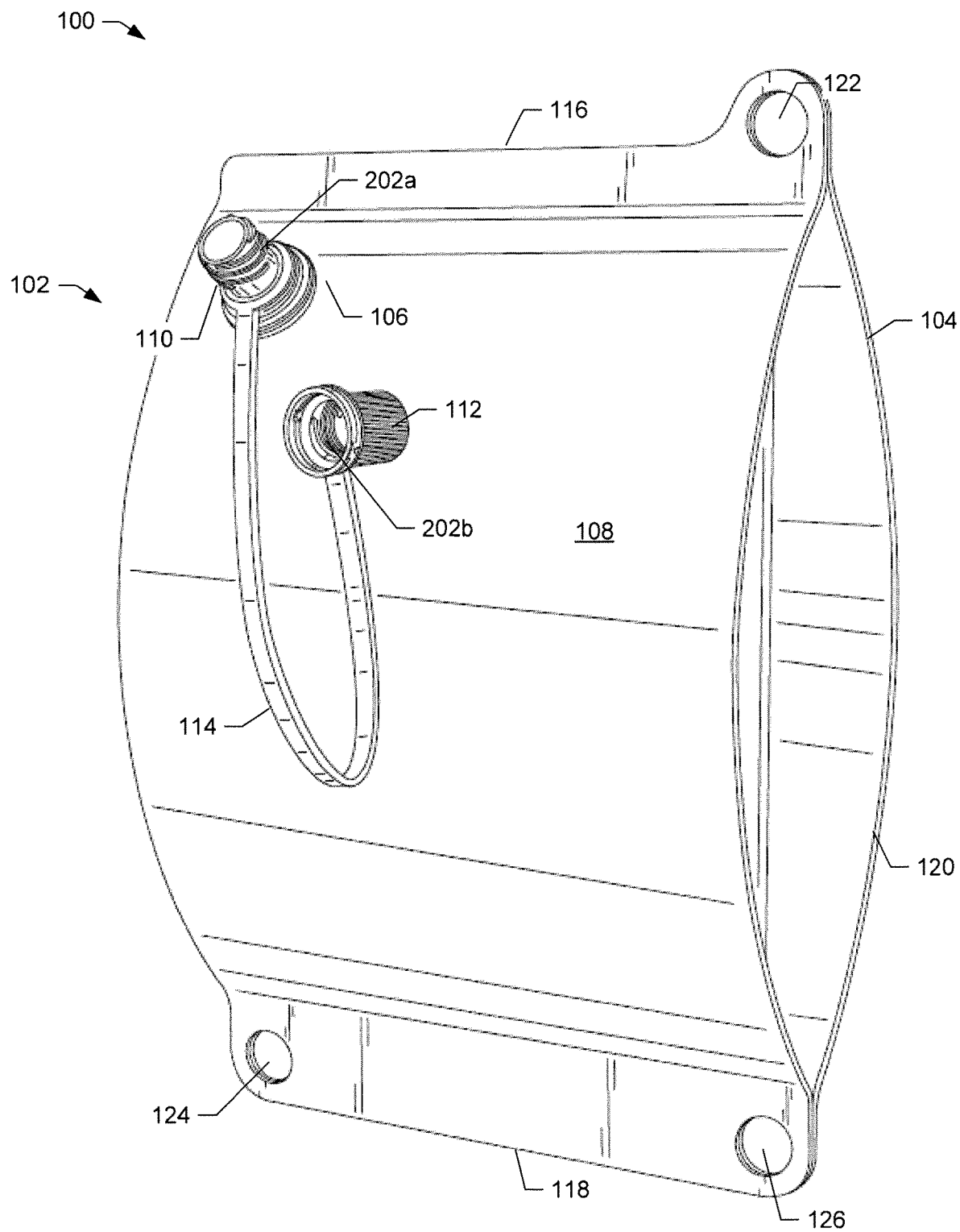
FIG. 2 shows a diagram of the example animal treat dispensing container of FIG. 1 with a nozzle cap detached from a nozzle, according to an example embodiment of the present disclosure.

FIG. 2 shows a diagram of the animal treat dispensing container 100 of FIG. 1 with the nozzle cap 112 removed from the nozzle 110, according to an example embodiment of the present disclosure. In the illustrated embodiment, the nozzle 110 and the nozzle cap 112 include respective screw threads 202a and 202b configured to create an air-tight seal when the nozzle and the nozzle cap 112 are connected via a screwing motion. In alternative embodiments, the nozzle 110 may be connected to the nozzle cap via other secure connection methods. For instance, the nozzle 110 and nozzle cap 112 may include press-connectors, snap-connectors, sliding connectors, pop-top connectors, etc.

Figure 3:
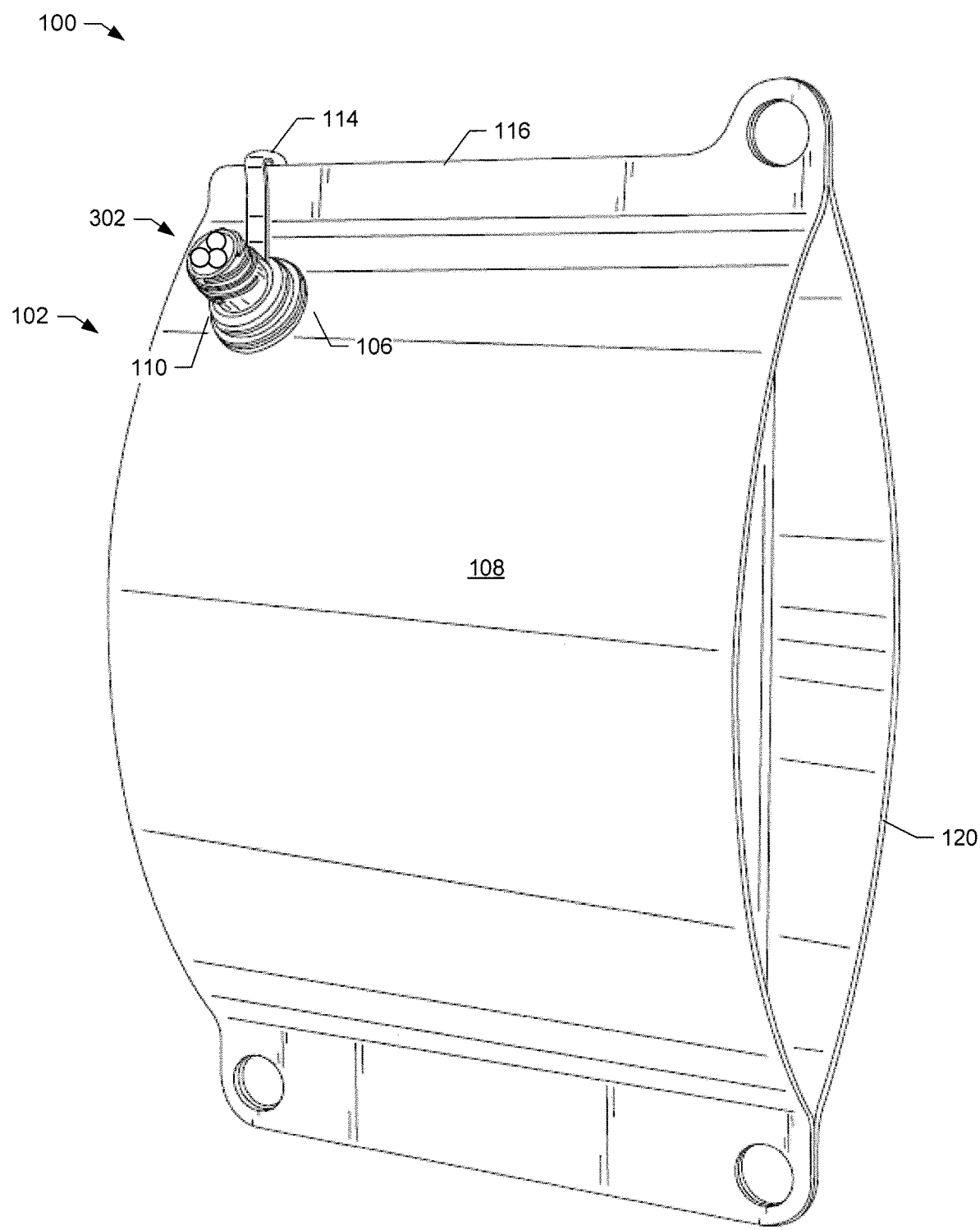
FIG. 3 shows a diagram of the example animal treat dispensing container of FIG. 2 with the nozzle cap placed away from the nozzle, according to an example embodiment of the present disclosure.

The example nozzle 110 may include a single through-hole or a plurality of holes. FIG. 2 shows the nozzle 110 with a single through-hole. FIG. 3 in contrast shows the nozzle 110 with three through-holes 302 each having a diameter less than a diameter of the nozzle 110. The use of more through-holes 302 may at least partially restrict the flow of a food substance from the pouch 102. For instance, the through-holes 302 may be used for relatively liquid food substances whereas a single through-hole (as shown in FIG. 2) may be used for relatively gelatin-like or more solid food substances.

In some instances, the through-holes within the nozzle 110 may be self-sealing. For example, the through-holes may include a gel or thin plastic cover that is configured to open in a center section to enable a portion of a food substance pass through when pressure is applied to the pouch 102. When pressure is released, the gel or plastic cover is configured to return to a closed position, thereby preventing excess air from entering (and preventing the food substance from unnecessarily escaping) the pouch 102.

The nozzle 110, including the through-holes, are configured to enable an animal lick a food substance directly from the pouch 102. As such, the nozzle 110 and through-holes are configured to enable a user to control a flow of a food substance by placing pressure on the pouch 102. Such a configuration enables a user to single-handedly control how much food substance a dog is to receive without providing excess food substance, which may get all over the dog, the exterior of the pouch 102, or the hands of the user.

As illustrated in FIGS. 1 to 3, the example pouch 102 is connected to tabs 116 and 118 (e.g., connecting areas). A top of the pouch 102 is connected to the top tab 116 and a bottom of the pouch 102 is connected to the bottom tab 118. The tabs 116 and 118 may be connected to the pouch 102 via any connection method including heat pressing or heat forming, stitching, melting, etc. In some embodiments, the tabs 116 and 118 may be integrated with the pouch 102 and formed by sealing or otherwise connecting the top and bottom of the first face 108 to a second face 120 of the pouch 120.

The top tab 116 includes a first hole 122 and the bottom tab 118 includes a second hole 124 and a third hole 126. The example holes 122 to 126 are configured to enable the treat dispensing container 100 to be connected to another apparatus or carried by a user. For example, the holes 122 to 126 may be dimensioned to accept a connector of a leash, a belt, or dog training strap. The holes 122 to 126 have diameters between 1 mm and 15 mm, and more preferable, about 10 mm. While FIGS. 1 to 5 shows the holes 122 to 126 positioned in proximity to the edges of the tabs 116 and 118, it should be appreciated that the holes 122 to 126 may be located almost anywhere along the tabs 116 and 118. Further the holes 122 to 126 may even extend from the tabs 116 and 118, as shown with the hole 122 extending from the tab 116. In other embodiments, the tabs 116 and 118 may include fewer or additional holes. Moreover, in some embodiments, the tabs 116 and 118 may be omitted.

It should be appreciated that a hole is not placed adjacent to or in proximity to the nozzle 110. Such a configuration prevents a mouth of an animal from accidently engaging or becoming hooked on a hole while the animal is engaging the nozzle 110. Preferably, the hole 122 on the top tab 116 is located at least 5 mm from the nozzle 110.

As discussed above, the nozzle 110 is connected to the nozzle cap 112 via the strap 114 (e.g., a lanyard). The example strap 114 may be made out of any material, preferably plastic and is configured to keep the nozzle cap 112 from becoming lost by a user or ingested by a dog. The example strap 114 may have any length, for example, between 10 mm and 150 mm. A longer length enables the nozzle cap 112 to be placed further away from the nozzle 110, and accordingly further away from a dog's mouth.

Figure 4:
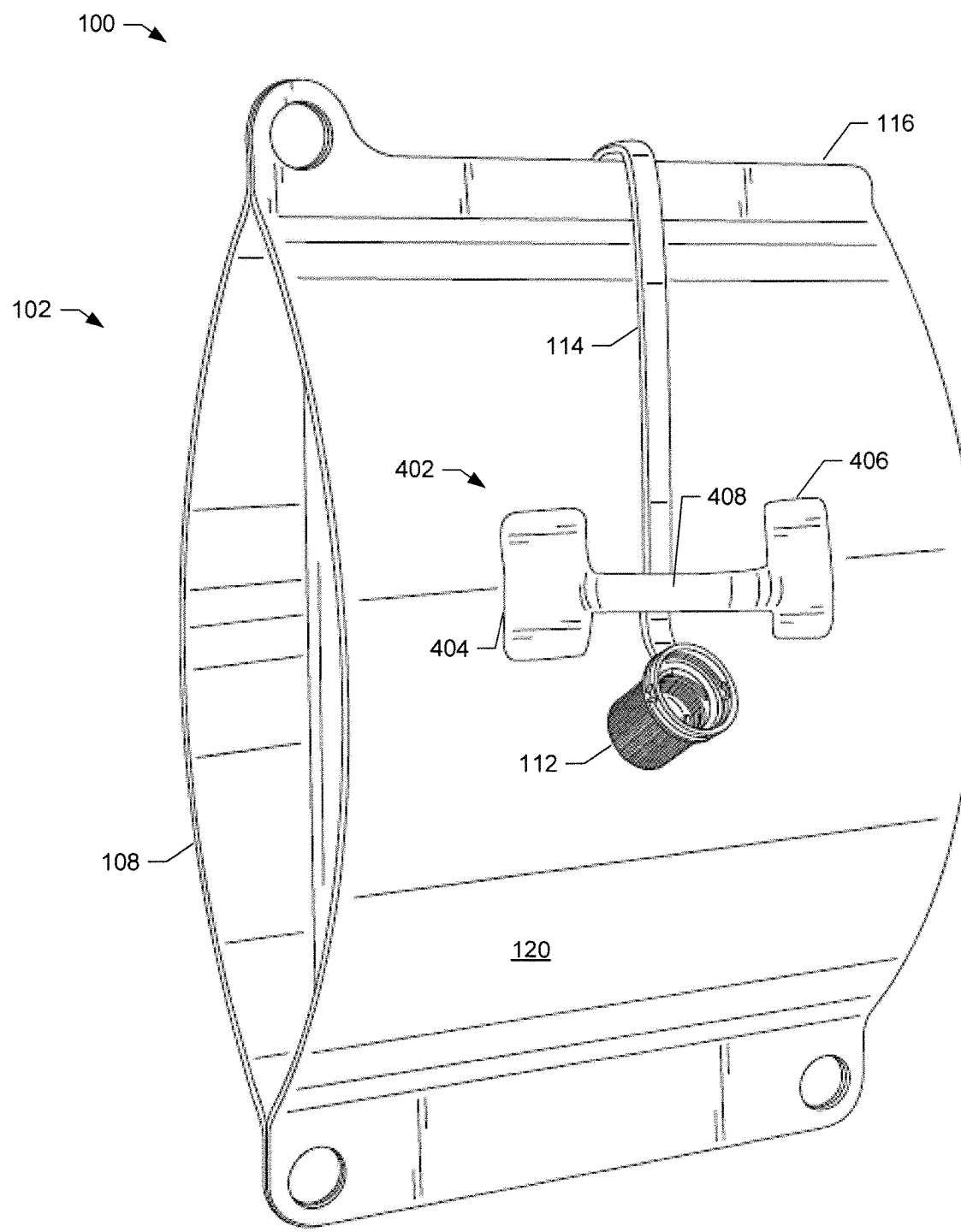
FIG. 4 shows a diagram of a rear-perspective of the example animal treat dispensing container of FIG. 3 with the nozzle cap secured by a hook, according to an example embodiment of the present disclosure.

FIGS. 3 and 4 show respective front and rear-perspective views of the example treat dispensing container 100 with the nozzle cap 112 and strap 114 placed at the second face 120 of the pouch 102, according to an example embodiment of the present disclosure. In this embodiment, a user folds or bends the strap 114 across the top tab 116 and secures the nozzle cap 112 to the second face 120 via a hook 402 (e.g., a fastener). The example strap 114 has a length sufficient to enable the nozzle cap 112 to be secured while a dog is feeding from the nozzle 110. Such a configuration prevents from nozzle cap 112 from being anywhere a dog's mouth while feeding, thereby preventing the dog from accidently chewing and ingesting the nozzle cap 112.

The example hook 402 of FIG. 4 is configured to secure at least a portion of the strap 114 and/or the nozzle cap 112 when the cap is removed from the nozzle 110. As illustrated, the example hook 402 includes a first side 404 configured to be permanently connected to the second face 120 (e.g., via a permanent adhesive, heat press, etc.) and a second side 406 configured to be detachably connected to the second face 120 (e.g., via a 'sticky' adhesive). The hook 402 further includes a midsection 408 that connects the first side 404 to the second side 406 and contacts at least the strap 114 and/or the nozzle cap 112.

The example hook 402 is configured to be substantially flush with the second face 120 to prevent the hook 402 from accidently catching on a user's pocket. For instance, the hook may extend less than 5 mm, and preferably less than 2 mm from the second face 120 when not securing the strap 114. In some instances, the hook 402 may be integrated with the second face 120 such that only an adhesive is used to detachably connect the second side 406 to the pouch 102.

In an alternative embodiment, the first side 402 and the second side 406 are both permanently connected to the second face 120. In this alternative embodiment, the midsection 408 is configured to for a gap with the second face 120. The nozzle cap 112 may be slid within the gap to secure the strap 114 with the midsection 408.

In yet an alternative embodiment, the hook 402 may have a different shape or may include a different type of fastener. For example, the hook 402 may include a receptacle configured to receive (and securely connect to) the nozzle cap 112. In another example, the hook 402 may include an indentation or slit within the second face 120 of the pouch 102 to temporarily secure the nozzle cap 112 during use.

Figure 5:
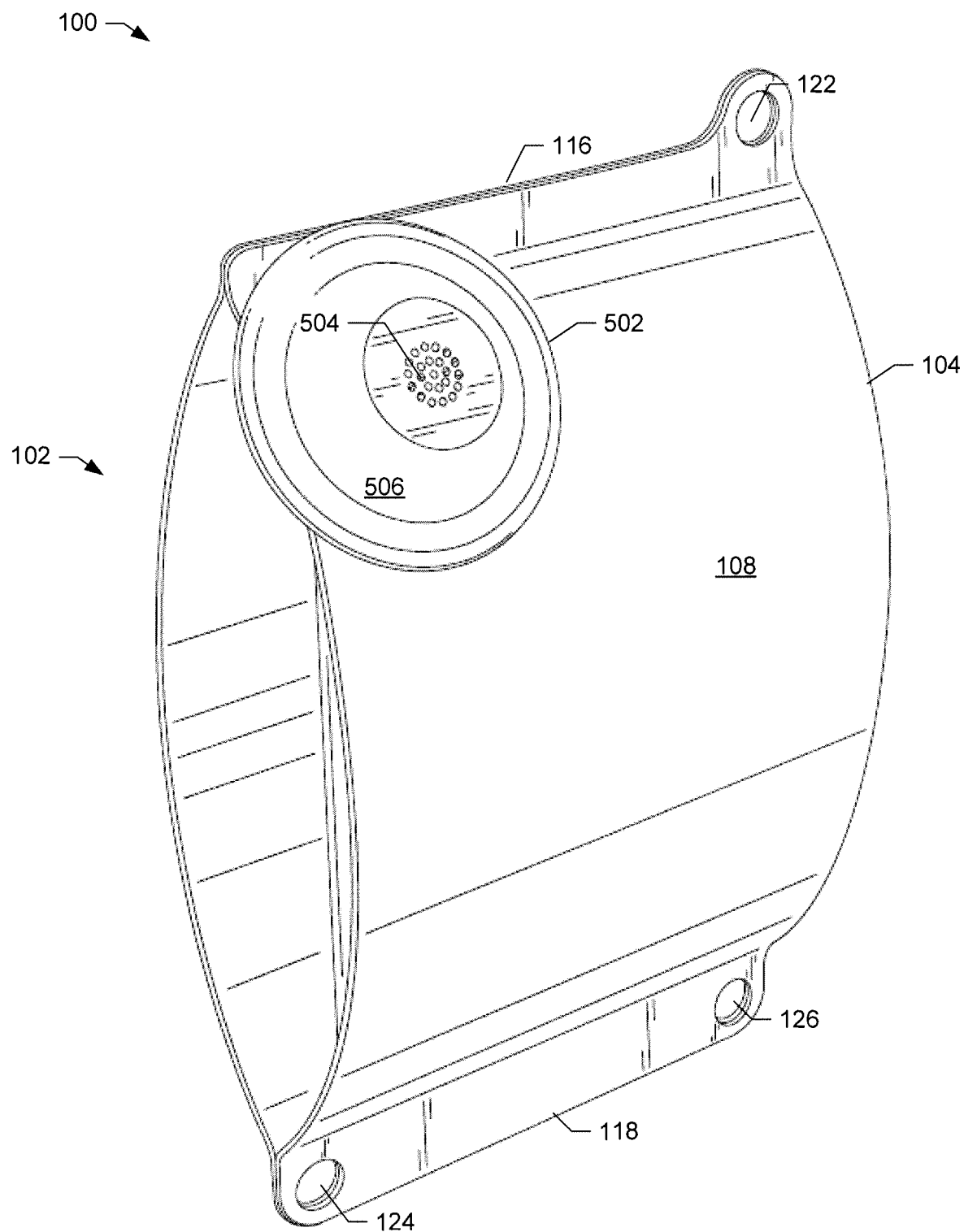
FIG. 5 shows a diagram of the example animal treat dispensing container of FIGS. 1 to 3 with a dispensing mechanism connected to the nozzle, according to an example embodiment of the present disclosure.
Figure 6:
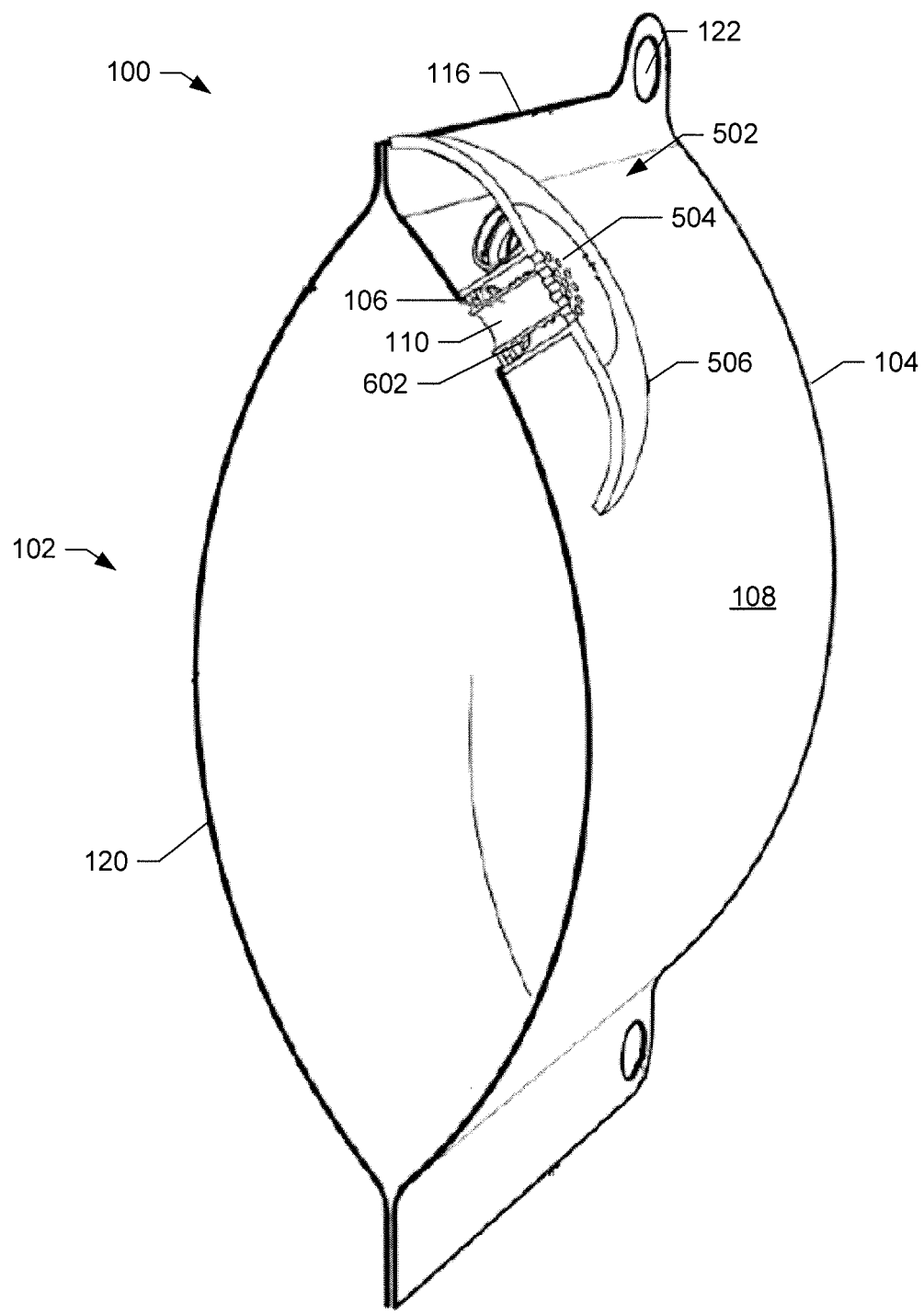
FIG. 6 shows a diagram of a side-perspective cutaway view of the example animal treat dispensing container of FIGS. 1 to 3 and 5 with the dispensing mechanism connected to the nozzle, according to an example embodiment of the present disclosure.

FIGS. 5 and 6 show a diagram of a dispensing mechanism 502 (e.g., a dispensing attachment) that may be connected to the nozzle 110 of the treat dispensing container 100, according to an example embodiment of the present disclosure. The example dispensing mechanism 502 may be connected after the nozzle cap 112 has been removed and secured. As illustrated in FIG. 5, the example dispensing mechanism 502 is configured to have a reverse-bowl shape conducive to being licked by a dog or other animal. The reverse-bowl shape also prevents a mouth of a dog from biting or otherwise engaging the nozzle 110, the nozzle cap 112, and/or the strap 114. The dispensing mechanism 502 has a diameter between 5 and 60 mm, and preferably about 40 mm.

The example dispensing mechanism 502 includes holes 504 to encourage a dog to lick a food substance rather than bite. For instance, during use, the food substance exits the holes 504 and travels to a bowl portion 506 of the dispensing mechanism 502. This encourages a dog to lick the dispensing mechanism 502 rather than attempt to bite the dispensing mechanism 502. Similar to the holes 302 of FIG. 3, the holes 504 of FIG. 5 may also be self-sealing. The holes 504 also control the distribution and evacuation of the food substance, thereby enabling less food to be dispensed without sacrificing effectiveness or appeal. This also prevents food from being wasted, saving customers money and helping dogs avoid weight gain and/or an upset stomach. The dispensing mechanism 502 may be removed from the nozzle 110 after use so that the nozzle cap 112 can be reconnected.

FIG. 6 shows a diagram of a side-perspective view of the treat dispensing container 100 and the dispensing mechanism 502, according to an example embodiment of the present disclosure. The example dispensing mechanism 502 includes screw threads 602 to enable the dispensing mechanism 502 to be screwed onto the nozzle 110. Alternatively, dispensing mechanism 502 includes a pressure or snap connector for connection to the nozzle 110. It should be appreciated that the type of connection is not limited to the embodiments discussed herein as long as the connection is secure enough to prevent being disconnected by a dog (or other animal) during use.

Figure 7:
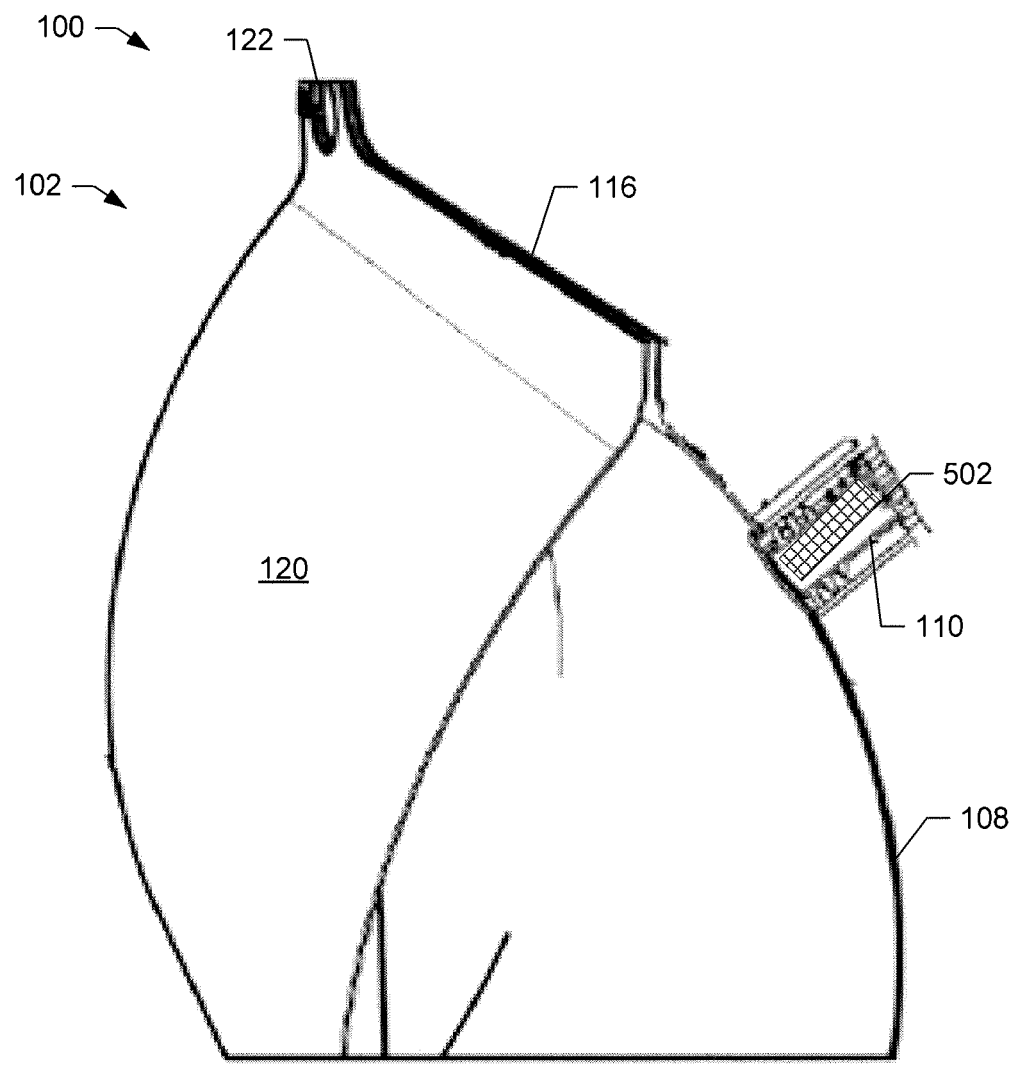
FIG. 7 shows a diagram of the example animal treat dispensing container of FIG. 6 with the dispensing mechanism inserted within the nozzle, according to an example embodiment of the present disclosure.

FIG. 7 shows a diagram of a side-perspective view of the treat dispensing container 100 with the dispensing mechanism 502 inserted within the nozzle 110, according to an example embodiment of the present disclosure. In some embodiments, the dispensing mechanism 502 may be packaged within the nozzle 110 at the time of manufacture. During user, the nozzle cap 112 is removed a user may extract the dispensing mechanism 502 from the nozzle 110. In some instances, the user may have to unfold the dispensing mechanism 502. In other instances, the dispensing mechanism 502 may unfold or open after being removed from the nozzle 110. After use, the dispensing mechanism 502 may be folded back into the nozzle 110. In some instances, the dispensing mechanism 502 may create a seal with the nozzle 110 such that the nozzle cap 112 is not necessary.

Additional Treat Dispensing Container Embodiments

It should be appreciated that the example treat dispensing container 100 may include addition features in addition to the featured discussed above in conjunction with FIGS. 1 to 7. For example, the pouch 102 may include a slot, recess portion, or other structure for accommodating an ice pack. Preferably, the slot is located on the second face 120 of the pouch 102 to avoid any possible contact with a dog. Such a configuration enables the food substance to stay cool for a longer period of time.

In another embodiment, the pouch 102 or the treat dispensing container 100 more generally may include multiple compartments. In some instances, the openings or outlets of the compartments may be connected together at the window 106 and/or the nozzle 110 to enable food substances in each compartment to be mixed together prior to be dispensed. In an example, a first compartment may include a relatively solid or concentrated food substance while a second compartment includes water or another liquid. Squeezing the pouch 102 during use may cause the food substance to mix with the liquid prior to being dispensed from the nozzle 110. Alternatively, squeezing the pouch 102 may cause the liquid to enter the food substance compartment (or vice versa) and mix with the food substance prior to be dispensed from the nozzle 110.

In yet another embodiment, the pouch 102 or the treat dispensing container 100 more generally may include multiple nozzles 110. In some instances, the nozzles 110 may be connected to the same food substance in one compartment. In these instances, the nozzles 110 may have different sizes or different sized (or numbered) holes 302 providing a user with an option select different dispensing rates or profiles. In other instances, the nozzles 110 may be connected to separate compartments within the pouch 102. Each compartment may include the same or different food substances. In one embodiment, the compartments include the same food substance to enable a user to unseal only half of the treat dispensing container 100 at a time, thereby extending the life of the container. In another embodiment, a first compartment may include a liquid and a second compartment may include a food substance. Such a configuration enables a user to also provide a liquid (e.g., water) to the dog after providing the food substance. In yet another embodiment, the first compartment may include a first food substance and a second compartment includes a second different food substance. Such a configuration enables a user to provide two different food substances (without having to carry two separate treat dispensing containers) during a training session.

In yet a further embodiment, the example nozzle 110, the pouch 102, and/or more generally the treat dispensing container 100 may be configured to be reusable. For instance, the nozzle 110 may include a clip or otherwise be connectable to a refill container. In other embodiments, the nozzle 110 may be detachable to enable a refill container to connect to the window 106 to refill the inside of the pouch 102 with the food substance.

Food Substance Embodiments

FIGS. 8 and 9 show diagrams of charts 800 and 900 of nutritional information for the food substance of the treat dispensing container 100 of FIGS. 1 to 7, according to an example embodiment of the present disclosure. The food substance disclosed herein has been found to provide superior results compared to known food substances in the training or behavioral modification of dogs. As discussed above, training or behavior modification using food rewards requires that the food hold a dog's attention during critical moments of the training or during a stimulating event. Generally, foods that are soft, chewy, moist, and smelly have been found to hold a dog's attention the longest and most effectively. The charts 800 and 900 show nutritional information of food substances that have been determined to hold a dong's attention for a relatively long duration for training while being healthy and all natural for the dog.

For instance, the chart 800 shows nutritional information for a sardines and cream cheese food substance. The ingredients include only sardines and cream cheese with a guaranteed minimum of about 6% to 8% crude protein and about 14% to 20% crude fat, and a guaranteed maximum of about 0% crude fiber and about 45% to 66% moisture. It should be appreciated that the ingredients do not include preservatives or artificial ingredients.

Similarly, the chart 900 shows nutritional information for a salmon and ricotta food substance. The ingredients include only salmon and ricotta with a guaranteed minimum of about 8% to 13% crude protein and about 3% to 5% crude fat, and a guaranteed maximum of about 0% crude fiber and about 54% to 78% moisture. Again, it should be appreciated that the ingredients do not include preservatives or artificial ingredients.

The example food substance disclosed herein is not limited to the sardines and cream cheese and salmon and ricotta items discussed above. Further, the food substance is not limited to the minimum and maximum percentages discussed about and shown in FIGS. 8 and 9. The food substance may include any edible food item suitable for dogs, humans, or other animals.

CONCLUSION

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

The use of the term "or" in the claims is used to mean "and/or" unless explicitly indicated to refer to alternatives only or the alternatives are mutually exclusive, although the disclosure supports a definition that refers to only alternatives and "and/or."

Groupings of alternative elements or embodiments of the animal treat dispensing container disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of example animal treat dispensing container are described herein, including the best mode known to the inventors for carrying out the invention. Of course, variations on those preferred embodiments will become apparent to those of ordinary skill in the art upon reading the foregoing description. Those of ordinary skill in the art are expected to employ such variations as appropriate, and the inventors intend for the invention to be practiced otherwise than specifically described herein. Accordingly, the example animal treat dispensing container includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the animal treat dispensing container so claimed are inherently or expressly described and enabled herein.

The invention is claimed as follows:

1. A treat dispensing container apparatus comprising:
   a pouch including an interior side, an exterior side, and a window located on a first face of the exterior side and an opposing face of the interior side, the window including a through-hole that enables access from the exterior side to the interior side of the pouch, the interior side being configured to contain a food substance ingestible by an animal;
   a nozzle connected to the window, the nozzle being configured to dispense the food substance contained within the interior side of the pouch;
   a nozzle cap configured to enclose the nozzle;
   a strap configured to connect the nozzle cap to the nozzle; and
   a hook located on a second face of the exterior side of the pouch, the second face located on an opposing side of the pouch from the first face, the hook being configured to secure at least one of the nozzle cap and the strap when the nozzle cap is removed from the nozzle,
   wherein top ends of the first face and the second face are connected to a tab section such that the positioning of the first face, the second face opposing the first face, and the tab section is configured to block the nozzle cap from contacting a mouth of the animal when the animal is engaged with the nozzle.

2. The apparatus of claim 1, wherein the location of the hook on the second face is configured to prevent the nozzle cap and the strap from contacting the mouth of the animal when the animal is engaged with the nozzle.

3. The apparatus of claim 1, wherein the hook includes a first side configured to be permanently connected to the exterior side of the pouch and a second side configured to be detachably connected to the exterior side of the pouch.

4. The apparatus of claim 1, wherein the hook is configured to be flush with the exterior side of the pouch such that the hook extends less than 5 mm from the exterior side of the pouch.

5. The apparatus of claim 1, wherein the window has a diameter between 1 millimeter (mm) and 25 millimeters.

6. The apparatus of claim 1, wherein the nozzle and the nozzle cap include screw threads configured to enable the nozzle cap to be screwed onto the nozzle.

7. The apparatus of claim 1, further comprising a dispensing attachment configured to be connected to the nozzle after the nozzle cap has been disconnected from the nozzle.

8. The apparatus of claim 7, wherein the dispensing attachment includes:
   screw threads to enable the dispensing attachment to be screwed onto the nozzle; or
   a pressure connector to enable the dispensing attachment to be snapped onto the nozzle.

9. The apparatus of claim 7, wherein the dispensing attachment includes self-sealing holes.

10. The apparatus of claim 7, wherein the dispensing attachment is configured to have an inverted bowl-shape configured to prevent a mouth of the animal from engaging at least one of the strap and the nozzle cap when the animal is engaged with the dispensing attachment.

11. The apparatus of claim 7, wherein the dispensing attachment has a diameter between 5 mm and 40 mm.

12. The apparatus of claim 7, wherein the dispensing attachment is configured to be located within the nozzle before the nozzle cap is removed and configured to expand and open after the nozzle is removed.

13. A treat dispensing container apparatus comprising:
   a pouch configured to contain a food substance ingestible by an animal;
   a top tab connected to a top of the pouch, the top tab including a hole at a first side;
   a bottom tab connected to a bottom of the pouch, the bottom tab including at least one hole;
   a nozzle connected to a first exterior face of the pouch and configured to enable the food substance to exit the pouch, the nozzle being located adjacent to a second side of the top tab opposite of the hole at the first side of the top tab;
   a nozzle cap configured to enclose the nozzle;
   a strap configured to connect the nozzle cap to the nozzle; and
   a hook located on a second exterior face of the pouch, the second exterior face located on an opposing side of the pouch from the first exterior face, the hook being configured to secure at least one of the nozzle cap and the strap after the nozzle cap is removed from the nozzle,
   wherein top ends of the first exterior face and the second exterior face are connected to the top tab such that the positioning of the first exterior face, the second exterior face, and the top tab is configured to block the nozzle cap from contacting a mouth of the animal when the animal is engaged with the nozzle.

14. The apparatus of claim 13, wherein the location of the nozzle with respect to the hole of the top tab prevents the mouth of the animal from contacting the hole of the top tab when the animal is engaged with the nozzle.

15. The apparatus of claim 13, wherein the top tab and the bottom tab are integrated with the pouch.

16. The apparatus of claim 13, wherein the pouch in conjunction with the nozzle and the nozzle cap are configured to be air-tight prior to use.

17. The apparatus of claim 13, wherein the holes of the top tab and the bottom tab have a diameter between 1 mm and 15 mm.

18. The apparatus of claim 13, wherein the nozzle includes two or more nozzle holes having diameters less than a diameter of the nozzle.

19. The apparatus of claim 18, wherein the nozzle holes are self-sealing.

20. A treat dispensing container safety apparatus comprising:
a pouch configured to contain a food substance ingestible by an animal;
a nozzle connected to a first exterior face of the pouch and configured to enable the food substance to exit the pouch;
a nozzle cap configured to enclose the nozzle;
a strap configured to connect the nozzle cap to the nozzle; and
a fastener located on a second exterior face of the pouch, the fastener being configured to secure at least one of the nozzle cap and the strap after the nozzle cap is removed from the nozzle,
wherein top ends of the first exterior face and the second exterior face are connected to a tab section such that the positioning of the first exterior face, the second exterior face, and the tab section is configured to block the nozzle cap from contacting a mouth of the animal when the animal is engaged with the nozzle.

21. The apparatus of claim 20, wherein the nozzle is securely connected to the pouch to prevent being disconnected when the mouth of the animal contacts the nozzle.

* * * * *